under 35 U.S.C. 154(b) by 670 days.

(12) United States Patent
Hedayat et al.

(10) Patent No.: US 9,930,535 B2
(45) Date of Patent: Mar. 27, 2018

(54) JOINT SCHEDULER FOR INTEGRATED WI-FI AND LTE-U WIRELESS ACCESS POINT

(71) Applicant: Cisco Technology, Inc., San Jose, CA (US)

(72) Inventors: Ahmadreza Hedayat, Allen, TX (US); Rajesh Pazhyannur, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 670 days.

(21) Appl. No.: 14/451,930

(22) Filed: Aug. 5, 2014

(65) Prior Publication Data

US 2016/0044516 A1    Feb. 11, 2016

(51) Int. Cl.
| | |
|---|---|
| *H04W 16/14* | (2009.01) |
| *H04L 12/873* | (2013.01) |
| *H04W 72/12* | (2009.01) |
| *H04W 88/10* | (2009.01) |
| *H04W 84/12* | (2009.01) |

(52) U.S. Cl.
CPC .......... *H04W 16/14* (2013.01); *H04L 47/52* (2013.01); *H04W 72/1215* (2013.01); *H04W 72/1247* (2013.01); *H04W 84/12* (2013.01); *H04W 88/10* (2013.01)

(58) Field of Classification Search
CPC ..... H04W 16/14; H04W 72/04; H04W 72/12; H04W 72/1216; H04W 72/1247; H04L 47/52; H04L 27/0006
See application file for complete search history.

(56) References Cited

U.S. PATENT DOCUMENTS

| | | | |
|---|---|---|---|
| 6,526,264 B2 | 2/2003 | Sugar et al. | |
| 2004/0264475 A1* | 12/2004 | Kowalski | H04L 12/5693 370/395.5 |
| 2006/0194540 A1* | 8/2006 | Hunzinger | H04W 72/1257 455/41.2 |

(Continued)

OTHER PUBLICATIONS

Bitran, et al., "Solving the coexistence of WiMAX, Bluetooth and WiFi in converged handsets," EE Times, Jun. 18, 2007, retrieved from http://www.eetimes.com/document.asp?doc_id=1275036 &print=yes, on Jun. 6, 2014., 5 pages.
InterDigital, Inc., "Dynamic Spectrum Management," White Paper, Oct. 2012, retrieved from http://www.interdigital.com/wp-content/uploads/2012/10/InterDigital-DSM-White-Paper_Oct2012.pdf, on Jun. 6, 2014, 14 pages.

(Continued)

*Primary Examiner* — Ian N Moore
*Assistant Examiner* — Ronald h Davis
(74) *Attorney, Agent, or Firm* — Edell, Shapiro & Finnan, LLC

(57) ABSTRACT

A wireless access point (AP) configured to operate in accordance with both Wi-Fi and Long-Term Evolution (LTE-U) standards/protocols jointly schedules transmit opportunities for Wi-Fi and LTE-U frames. The AP assigns one of multiple, prioritized, Wi-Fi access categories to each Wi-Fi transmit frame based on a type of data in the transmit frame. The AP also assigns to each LTE-U transmit frame an LTE-U access category prioritized relative to the Wi-Fi access categories. The AP schedules Wi-Fi and LTE-U transmit opportunities for the Wi-Fi transmit frames and the LTE-U transmit frames, respectively, in the shared channel bandwidth based on the prioritized Wi-Fi and LTE-U access categories.

25 Claims, 8 Drawing Sheets

(56) References Cited

U.S. PATENT DOCUMENTS

| | | | | |
|---|---|---|---|---|
| 2007/0171909 | A1* | 7/2007 | Pignatelli | H04L 12/5693 370/392 |
| 2011/0044218 | A1* | 2/2011 | Kaur | H04W 72/1215 370/310 |
| 2012/0051342 | A1* | 3/2012 | Liu | H04W 72/10 370/338 |
| 2012/0069766 | A1* | 3/2012 | Fu | H04B 1/406 370/252 |
| 2013/0337821 | A1* | 12/2013 | Clegg | H04L 5/0062 455/452.1 |
| 2014/0044105 | A1* | 2/2014 | Bontu | H04L 5/001 370/336 |
| 2015/0124740 | A1* | 5/2015 | Chen | H04W 16/14 370/329 |
| 2015/0223075 | A1* | 8/2015 | Bashar | H04W 16/14 370/329 |
| 2015/0271226 | A1* | 9/2015 | Luby | H04L 47/125 709/231 |
| 2015/0334744 | A1* | 11/2015 | Ji | H04W 74/0816 370/336 |

OTHER PUBLICATIONS

Yang, et al., "Coexistence-Aware Scheduling for Wireless System-on-a-Chip Devices," 2010 7th Annual IEEE Communications Society Conference on Sensor Mesh and Ad Hoc Communications and Networks (SECON), Jun. 2010, 9 pages.

* cited by examiner

JOINT SCHEDULER FOR INTEGRATED WI-FI AND LTE-U WIRELESS ACCESS POINT

TECHNICAL FIELD

The present disclosure relates to wireless access points.

BACKGROUND

Long-Term Evolution-Unlicensed (LTE-U) is an adaptation of the LTE standard that operates in unlicensed frequency bands. As currently defined by the $3^{rd}$ Generation Partnership Project (3GPP), LTE-U targets 5 GHz and other unlicensed frequency bands. As a consequence, LTE-U operates in some of the same frequency bands defined for the IEEE 802.11 or "Wi-Fi" standards, e.g., 2.4 GHz and 5 GHz frequency bands. The spectrum overlap between LTE-U and Wi-Fi can present a spectrum access problem for co-located Wi-Fi and LTE-U wireless access points or an integrated access point configured to operate in accordance with both the Wi-Fi and LTE-U standards. Transmit access sharing protocols for LTE-U and Wi-Fi are not yet defined. Thus, contention for spectrum access arises when an integrated Wi-Fi/LTE-U access point needs to transmit both Wi-Fi and LTE-U data to respective Wi-Fi and LTE-U client devices at the same time.

DESCRIPTION OF EXAMPLE EMBODIMENTS

Overview

Techniques presented herein relate to jointly scheduling transmit opportunities for first protocol frames and second protocol transmit frames according to a second wireless protocol in a shared channel bandwidth that encompasses unlicensed channel bandwidth associated with the second wireless protocol in an access point (AP). The AP assigns one of multiple, prioritized, first protocol access categories to each first protocol transmit frame based on a type of data in the transmit frame, and assigns to each second protocol transmit frame a second protocol access category prioritized relative to the first protocol access categories. The AP schedules first and second transmit opportunities for the first protocol transmit frames and the second protocol transmit frames, respectively, in the shared channel bandwidth based on the prioritized first and second protocol access categories.

Figure 1:
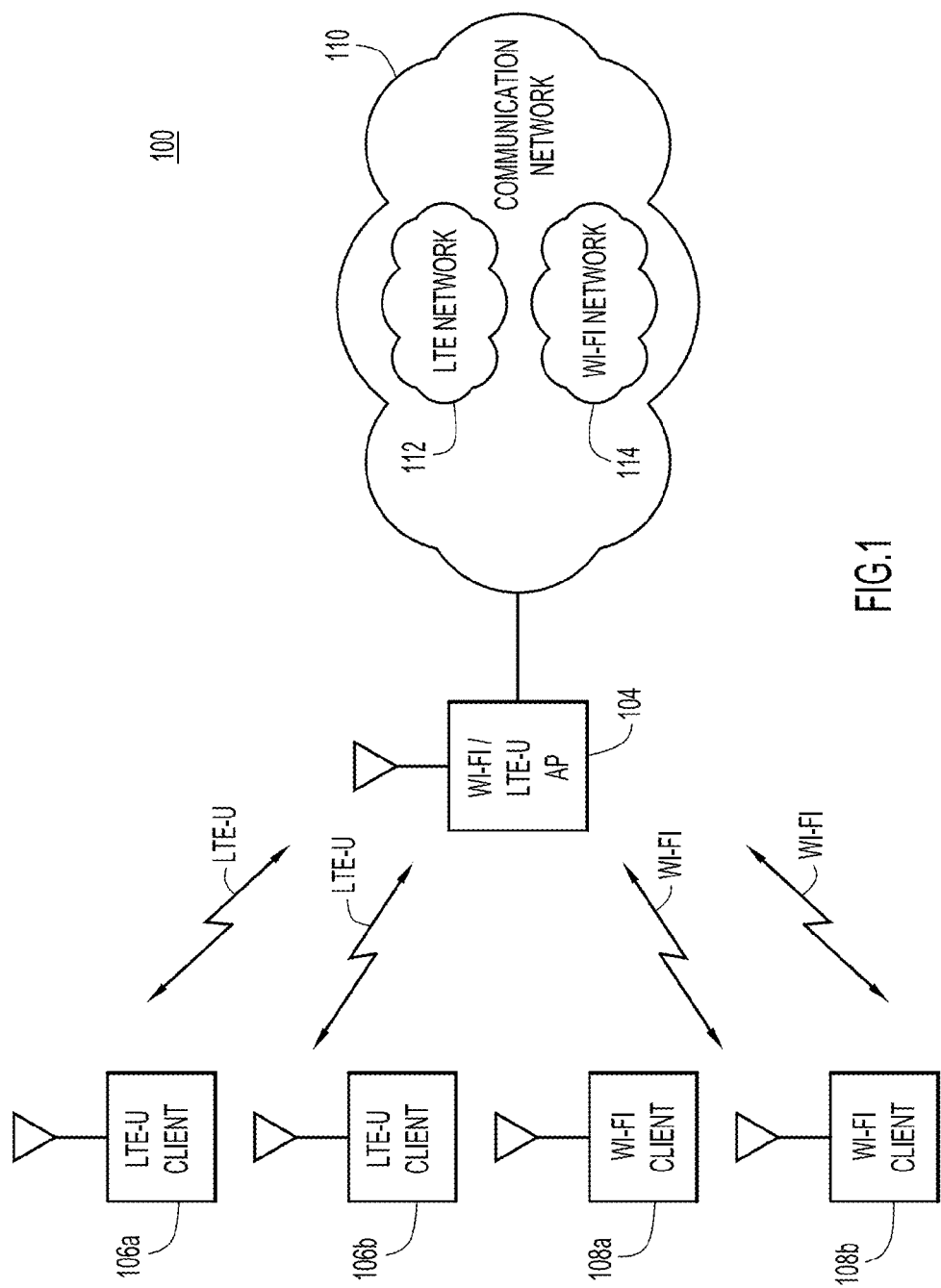
FIG. 1 is a diagram of a wireless communication network environment in which a wireless access point (AP) implements techniques to jointly schedule transmit opportunities for both Wi-Fi and LTE-U frames, according to an example embodiment.

In one embodiment, the AP transmits Wi-Fi transmit frames as the first transmit protocol frames and Long-Term Evolution-Unlicensed (LTE-U) transmit frames as the second transmit protocol frames in accordance with Wi-Fi and LTE-U protocols, respectively. The AP assigns multiple, prioritized, Wi-Fi access categories to each Wi-Fi transmit frame based on a type of data in the transmit frame and assigns to each LTE-U transmit frame a LTE-U access category prioritized relative to the Wi-Fi access categories. The AP schedules Wi-Fi and LTE-U transmit opportunities for the Wi-Fi transmit frames and the LTE-U transmit frames, respectively, in the shared channel bandwidth based on the prioritized Wi-Fi and LTE-U access categories. The AP may use Enhanced Distributed Channel Access (EDCA) rules to schedule the transmit opportunities Example Embodiments Referring first to FIG. 1, there is shown a diagram of an example wireless communication network environment 100 in which a wireless access point (AP) implements techniques to jointly schedule the transmission of multimode (e.g., both Wi-Fi and LTE) transmit frames. Environment 100 includes a wireless multimode AP 104 configured to operate concurrently in accordance with multiple wireless communication standards/protocols including, for example, (i) the Long-Term Evolution (LTE) standard (such as 4G LTE), or LTE-Unlicensed (LTE-U), and (ii) any of the IEEE 802.11 wireless standards (i.e., the "Wi-Fi" standards). In embodiments described herein, AP 104 is referred to as an integrated Wi-Fi/LTE-U AP. AP 104 communicates wirelessly with LTE-U client devices 106a and 106b configured to operate in accordance with LTE-U and with Wi-Fi client devices 108a and 108b configured to operate in accordance with the Wi-Fi standard.

AP 104 transmits/receives appropriately formatted wireless communication signals to/from LTE-U and Wi-Fi client devices 106 and 108, as follows. In a downlink direction, AP 104 formats frames, containing, e.g., voice, video, data, and so on, according to the LTE-U and Wi-Fi standards and transmits the formatted LTE-U and Wi-Fi frames (i.e., transmit frames) to LTE-U client devices 106 and Wi-Fi client devices 108, respectively. In an uplink direction, Wi-Fi client devices 108 format and transmit Wi-Fi formatted frames to AP 104, and the AP processes the received frames according to the Wi-Fi standard. A "frame" may also be referred to herein as a "Protocol Data Unit" (PDU) and is meant to encompass frames and sub-frames, unless specified otherwise.

AP 104 also communicates with a communication network 110, which may include one or more wide area networks (WANs), such as the Internet, and one or more local area networks (LANs). Communication network 110 also includes or is connected with multiple mobile/wireless networks, including LTE network(s) 112 and Wi-Fi network(s) 114. AP 104 connects with communication network 110 wirelessly or through wired connections and provides client devices 106 and 108 with access to the LTE and Wi-Fi networks 112 and 114.

In accordance with techniques presented herein, AP 104 accumulates Wi-Fi and LTE-U frames or PDUs to be transmitted to client devices 106 and 108, and jointly schedules transmit opportunities for the accumulated frames (i.e., schedules the accumulated frames for transmission), as will be described more fully below. In one embodiment, AP 104 jointly schedules the Wi-Fi and LTE-U frames for transmission in a shared channel bandwidth. The Wi-Fi and LTE-U frames may be, but are not necessarily, scheduled for serial, mutually exclusive transmission. In another embodiment, AP 104 jointly schedules the Wi-Fi and LTE-U frames for concurrent or parallel transmission in different channel bandwidths.

Figure 2:
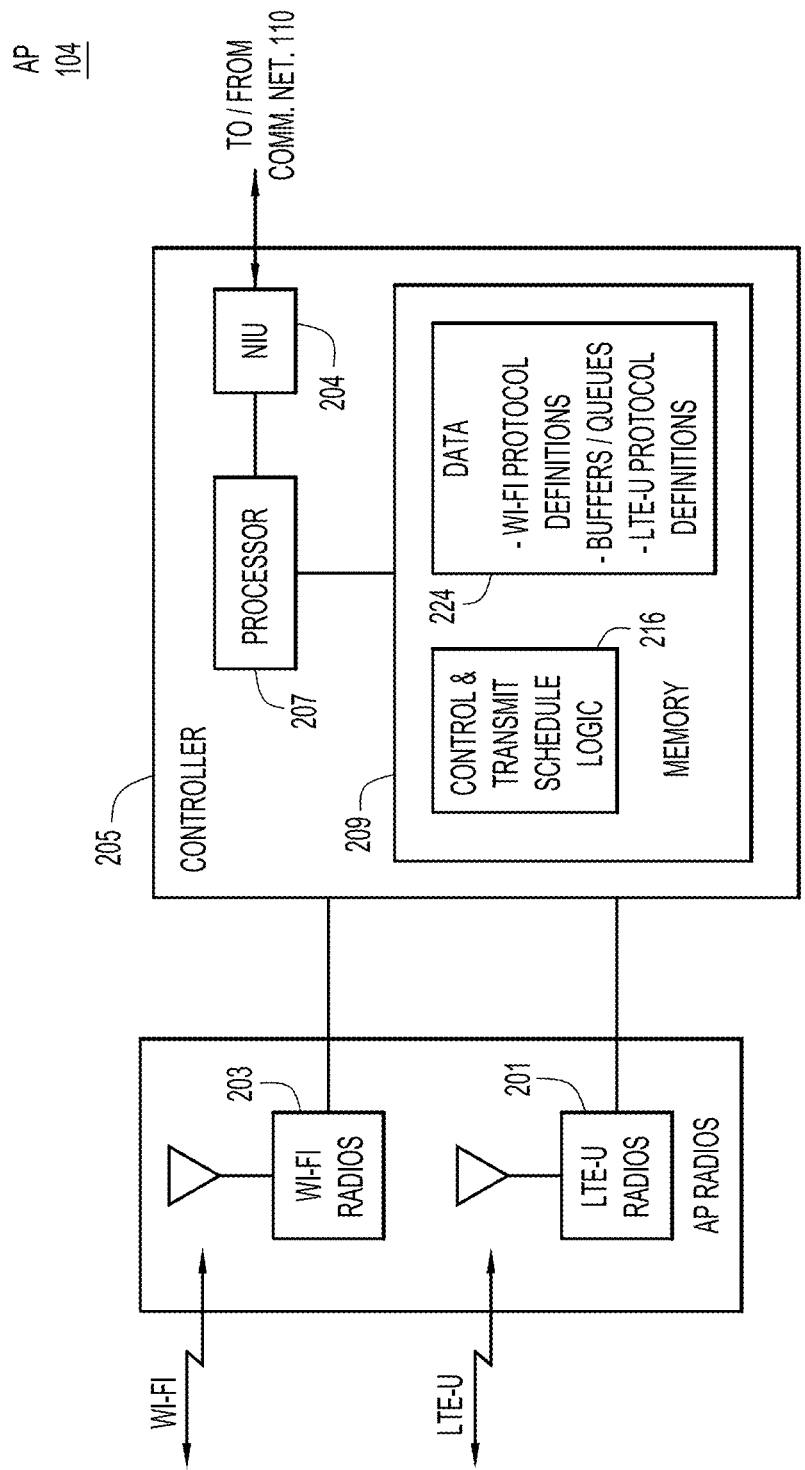
FIG. 2 is a block diagram of the AP of FIG. 1, according to an example embodiment.

With reference to FIG. 2, there is shown a block diagram of AP 104 configured to jointly schedule transmit opportunities for Wi-Fi and LTE-U frames, according to an embodiment. AP 104 includes a wireless LTE-U radio 201 (also referred to a wireless transmitter/receiver or "transceiver" 201) to support wireless LTE-U communication with LTE-U clients 106, a wireless Wi-Fi radio 203 to support wireless Wi-Fi communication with Wi-Fi clients 108, and an AP controller 205 to which the radios are coupled. Radios 201 and 203 may be integrated into a single radio. LTE-U radio 201 transmits in LTE-U defined frequency bands and Wi-Fi radio 203 transmits in Wi-Fi defined frequency bands that may overlap the LTE-U frequency bands. Each of radios 201 and 203 includes a respective set of one or more antennas.

AP 104 may include a wired network interface unit (NIU) 215, such as an Ethernet interface, that enables the AP to connect to communication network 110. NIU 215 may also include wireless connection capability.

AP controller 205 includes a processor 207, and a memory 209. Processor 207 is a microcontroller or microprocessor, for example, configured to execute software instructions stored in memory 209. Memory 209 may comprise read only memory (ROM), random access memory (RAM), magnetic disk storage media devices, optical storage media devices, flash memory devices, electrical, optical, or other physical/ tangible (e.g., non-transitory) memory storage devices. Thus, in general, memory 209 may comprise one or more computer readable storage media (e.g., a memory device) encoded with software comprising computer executable instructions and when the software is executed (by processor 207) it is operable to perform the operations described herein.

For example, memory 209 stores or is encoded with instructions for Control and Schedule logic 216 to perform (i) overall control of AP 104 in both of the Wi-Fi and LTE-U operating modes, and (ii) joint scheduling of transmit opportunities for both Wi-Fi and LTE-U frames. Memory 209 also stores information/data 224 used by logic 216, including, but not limited to, LTE-U and Wi-Fi protocol definitions (e.g., frame formats), frame transmit buffers or queues, and the like.

Figure 3:
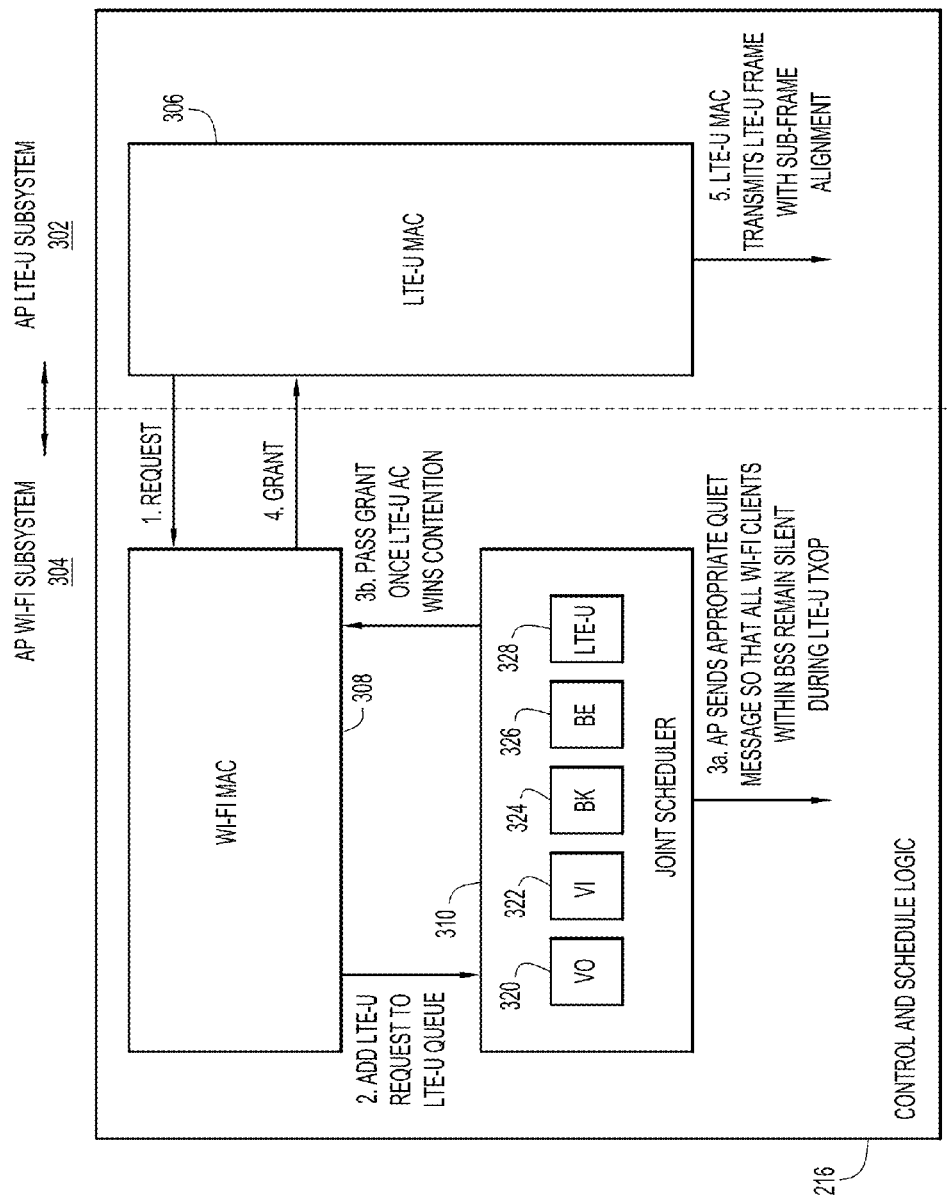
FIG. 3 is a block diagram of Transmit Schedule logic of the AP partitioned between a Long-Term Evolution-Unlicensed (LTE-U) subsystem and a Wi-Fi subsystem, according to an example embodiment.

FIG. 3 is a block diagram of Control and Schedule logic 216 in an embodiment of AP 104 in which the AP is partitioned into an LTE-U subsystem 302 and a Wi-Fi subsystem 304. Control and Schedule logic 216 includes: an LTE-U Media Access Controller (MAC) 306 to perform media access control functions specific to LTE-U subsystem 302, including transmission of LTE-U frames via radio 201; and, allocated to Wi-Fi subsystem 304, a Wi-Fi MAC module 308 to perform Wi-Fi media access control functions (including transmission of Wi-Fi frames via radio 203) and assist in jointly scheduling LTE-U transmit opportunities (as described below), and a joint scheduler 310 to jointly schedule transmit opportunities for LTE-U and Wi-Fi frames. Joint scheduler 310 includes Wi-Fi and LTE-U queues or buffers 320-328 described in more detail below.

Figure 4A:
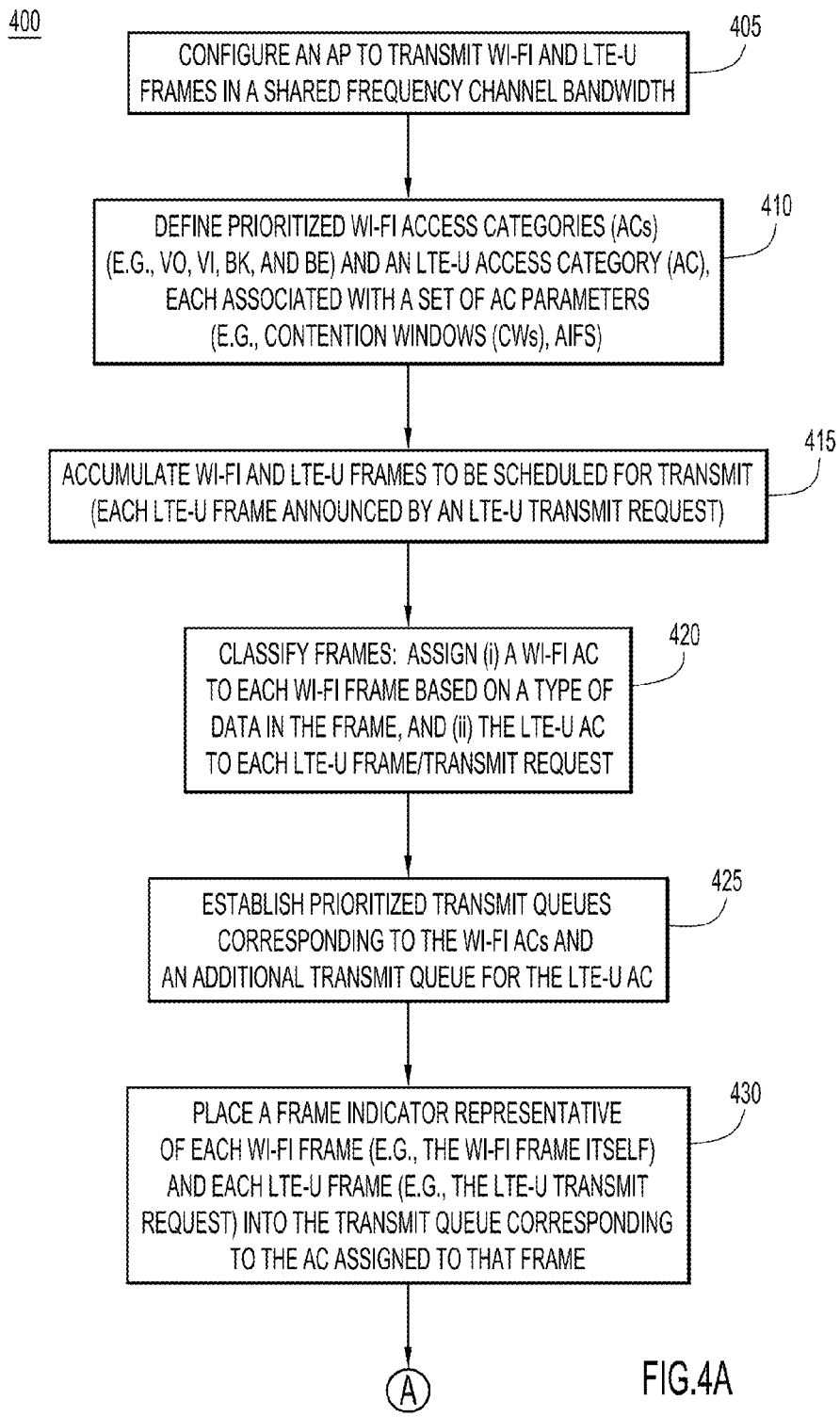
FIGS. 4A and 4B illustrate a flowchart of a method for jointly scheduling LTE-U and Wi-Fi frames for transmission in a shared channel bandwidth that is performed in the AP, according to an example embodiment.
Figure 4B:
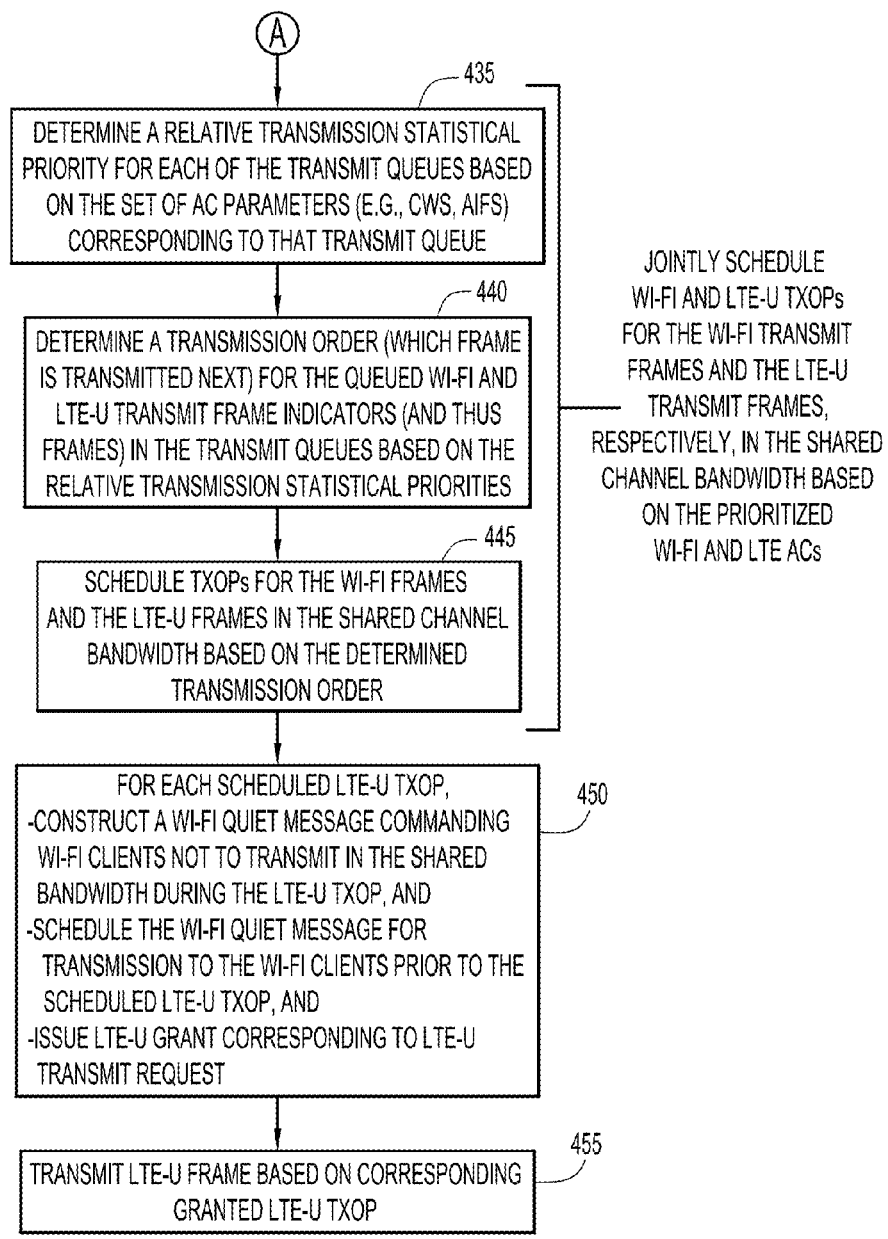

With reference to FIGS. 4A and 4B, there is shown a flowchart of an example method 400 of jointly scheduling LTE-U and Wi-Fi frames in a shared channel bandwidth, performed by AP 104. The shared channel bandwidth includes one or more frequency channels shared by Wi-Fi and LTE-U transmission. The shared frequency channels may be the same frequency channels or overlapping frequency channels used for Wi-Fi and LTE transmissions. The shared channel bandwidth may include in a Wi-Fi primary channel, for example. Method 400 is described with reference also to the example embodiment depicted in FIG. 3.

At 405, controller 205 configures AP 104 to transmit both Wi-Fi and LTE-U frames in a shared channel bandwidth (e.g., 40 or 80 MHz) based on configuration information received by the controller.

At 410, controller 205 defines prioritized Wi-Fi access categories (ACs), including, e.g., Voice (VO), Video (VI), Background (BK), and Best Effort (BE) ACs. Controller 205 also defines an LTE-U AC that is prioritized relative to the Wi-Fi ACs. The Wi-Fi ACs and the LTE-U AC are each associated with a distinct set of Quality-of-Service (QoS) parameters (also referred to as AC parameters), such as Contention Windows (CWs) (e.g., CWmin, CWmax), and Arbitration Inter-Frame Space (AIFS) AIFS values.

At 415, controller 205 receives Wi-Fi frames and LTE-U frames to be scheduled for transmit to corresponding client devices 108 and 106. In the example of FIG. 3, Wi-Fi MAC 308 accumulates the Wi-Fi frames and LTE-U MAC 306 accumulates the LTE-U frames. For each LTE-U frame, LTE-U MAC 306 sends to Wi-Fi MAC 308 an LTE-U transmit request (indicated at "1" in FIG. 3) corresponding to that LTE-U frame, in lieu of the LTE-U frame itself. The LTE-U transmit request is a request to transmit the corresponding LTE-U frame, and specifies a size of the corresponding LTE-U frame, a requested transmit duration for the frame, a type or types of data carried in the LTE-U frame, e.g., voice, video, data, or a mix thereof, and possibly a percentage of the frame that is filled with the specific type of data. Example requested transmit durations may be in multiples of 1 millisecond (ms) because each LTE-U sub-frame has a duration of 1 ms.

At 420, controller 205 classifies the accumulated frames into corresponding ACs. To do this, controller assigns: (i) an appropriate one of the Wi-Fi ACs to each Wi-Fi frame based on a type of data in the frame (e.g., voice, video, background, best effort), and (ii) the LTE-U AC to each LTE-U frame. In the example of FIG. 3, Wi-Fi MAC 308 classifies each Wi-Fi frame into the appropriate AC, and associates each received LTE-U transmit frame request with the LTE-U AC.

At 425, controller 205 establishes prioritized transmit queues or buffers corresponding to the Wi-Fi ACs (e.g., VO, VI, BK, and BE Wi-Fi queues) and an additional transmit queue for the LTE-U AC (e.g., an LTE-U queue). In the example of FIG. 3, joint scheduler 310 forms VO queue 320, VI queue 322, BK queue 324, and BE queue 326 for the Wi-Fi frames/ACs and LTE-U queue 328 corresponding to the LTE-U frames/AC.

At 430, controller 205 places a transmit frame indicator representative of each Wi-Fi frame and each LTE-U frame to be scheduled for transmission into the transmit queue corresponding to the AC assigned to that frame at 420. In one example, the transmit frame indicator for each Wi-Fi frame is the corresponding Wi-Fi frame itself so that the Wi-Fi queues are filled with Wi-Fi frames, while the transmit frame indicator for each LTE-U frame may be the corresponding LTE-U transmit request in lieu of the LTE-U frame so that the LTE-U queue is filled only with LTE-U transmit frame requests. In another example, each LTE-U frame itself may be placed into the LTE-U queue instead of the corresponding LTE-U transmit request (similar to the Wi-Fi queues). In the example of FIG. 3, Wi-Fi MAC 308 places each Wi-Fi frame into the one of Wi-Fi queues 320-326 associated with the same AC as the frame, and each LTE-U transmit request (indicated at "2" in FIG. 3) in lieu of the LTE-U frame represented by that request into LTE-U queue 328.

In next operations 435-445 collectively, controller 205 (e.g., joint scheduler 310) jointly schedules Wi-Fi and LTE-U transmit opportunities for the Wi-Fi transmit frames and the LTE-U transmit frames, respectively, in the shared channel bandwidth based on the prioritized Wi-Fi and LTE-U ACs, in the manner described below.

At 435, controller 205 determines a relative transmission statistical priority for each of the transmit queues based on the set of AC parameters (e.g., the CW and AIFs parameters) corresponding to that transmit queue. In the example of FIG. 3, joint scheduler 310 determines the transmission statistical priorities for transmit queues 320-328.

At 440, controller 205 determines a transmission order for the queued Wi-Fi and LTE-U transmit frame indicators (and thus the frames represented thereby) in the transmit queues based on the relative transmission statistical priorities. Frames from higher priority queues are scheduled for transmission before frames from lower priority queues are scheduled for transmission.

At 445, controller 205 schedules transmit opportunities for the Wi-Fi frames and the LTE-U frames in the shared channel bandwidth based on the transmission order. Each transmit opportunity (TXOP) is represented by a frame transmit start time and a frame transmit duration or time period.

Figure 6:
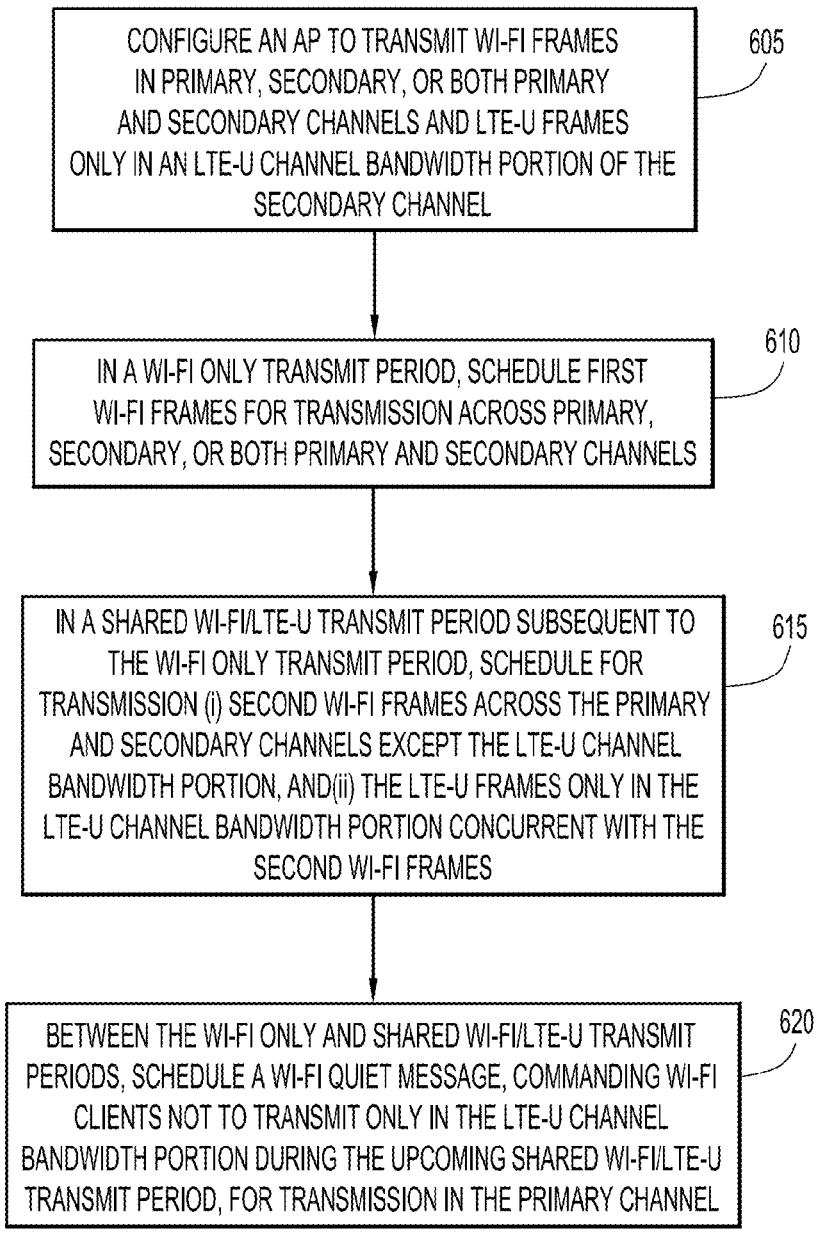
FIG. 6 is a flowchart of a method of jointly scheduling LTE-U and Wi-Fi frames for transmission in primary and secondary channels that is performed in the AP, according to an example embodiment.

Joint scheduler 310 may apply one or more of the following scheduling rules to schedule the LTE-U transmit opportunities:

a. The LTE-U AC (and LTE-U queue) wins schedule contention for transmit opportunities relative to the Wi-Fi ACs (and Wi-Fi queues) according to a set of Enhanced Distributed Channel Access (EDCA) rules (i.e., joint scheduler 310 applies the EDCA rules across the Wi-Fi and LTE-U ACs) and the sets of AC parameters associated with the Wi-Fi and LTE-U ACs. For example, with an appropriate choice of LTE-U CW parameters, joint scheduler 310 maintains a fair share of transmit opportunities across both Wi-Fi and LTE-U frames. In one embodiment, the LTE-U AC and Wi-Fi BE AC share a common set (i.e., the same set) of CW parameters. In other embodiments, the LTE-U AC uses CW parameters different from those associated with each of the Wi-Fi ACs. The manner in which the sets of AC parameters may be use to establish transmit priorities is described in detail below after FIG. 6 is described;

b. Under the LTE-U standard, AP 104 is required to transmit LTE-U frames so as to be roughly time-aligned with LTE-U system sub-frame boundaries. Thus, joint scheduler 310 sets the transmit duration of each LTE-U transmit opportunity to a time period that is longer than the transmit duration requested in the LTE-U transmit request. The additional time gives LTE-U MAC 306 flexibility to align a start time of the transmitted LTE-U frame with the LTE-U system sub-frame boundary. For example, if the requested transmit duration is 1 ms, joint scheduler 110 schedules a transmit opportunity with a transmit duration of longer than 1 ms because the joint scheduler is unaware (but LTE-U MAC 306 is aware) of when the next immediate LTE-U system sub-frame boundary will occur;

c. Joint scheduler 310 may apply a maximum number of sub-frames that can be reserved by LTE-U MAC 306 (via the transmit request);

d. Joint scheduler 310 may take steps to ensure that the requested LTE-U transmit opportunity for an equivalent of a LTE-U sub-frame is almost fully utilized; and e. LTE-U MAC 306 may add additional attributes to the LTE-U transmit request to indicate a high priority request. This is useful in cases where the LTE-U AC (i.e., queue) has not won contention for a transmit opportunity relative to the Wi-Fi ACs (i.e., queues), but: (i) the LTE-U frame to be transmitted has a full or almost full frame load and a given percentage of LTE-U traffic is about to exceed a Packet Delay Budget; or (ii) LTE-U MAC 306 has accumulated a maximum number of blank LTE-U sub-frames such that at least LTE-U synchronization signals need to be transmitted.

At 450, for each scheduled LTE-U transmit opportunity, controller 405 constructs a Wi-Fi quiet message addressed to Wi-Fi clients in a Basic Service Set (BSS) served by AP 104. The quiet message may include a Quiet element (defined in IEEE 802.11n) or a Quiet Channel element (defined in IEEE 802.11ac), for example. The quiet message is used to command the Wi-Fi clients not to transmit in the shared channel bandwidth during the LTE-U transmit opportunity. In an example, the quiet message announces to the Wi-Fi clients a quiet period for the Wi-Fi clients equal to the transmit duration of the LTE-U transmit opportunity, plus a guard time before the start of the transmit duration. Controller 405 schedules the constructed Wi-Fi quiet message for transmission to the Wi-Fi clients prior to the scheduled LTE-U transmit opportunity. In an alternative embodiment, AP 104 sends a Clear-to-Send-to-self (CTS-to-self) frame during the LTE-U transmit opportunity transmit duration, plus the guard time.

In the example of FIG. 3, joint scheduler 310 constructs, schedules, and sends the Wi-Fi quiet message (indicated at "3a" in FIG. 3) prior to and in anticipation of the scheduled LTE-U transmit opportunity. The Wi-Fi quiet message may be sent in a beacon frame, for example.

Also at 450, in the example of FIG. 3, after each LTE-U transmit opportunity has been scheduled and after the corresponding quiet message 3a has been sent, joint scheduler 310 issues an LTE-U grant (indicated at "3b" in FIG. 3) to Wi-Fi MAC 308 to indicate a corresponding scheduled LTE-U transmit opportunity and, in turn, Wi-Fi MAC 308 forwards the LTE-U grant (indicated at "4" in FIG. 3) to LTE-U MAC 306. The LTE-U grant conveys the transmit start time and duration of the scheduled LTE-U transmit opportunity to LTE-U MAC 306.

In another embodiment that minimizes signaling between LTE-U MAC 306 and Wi-Fi MAC 308 (e.g., minimizes how often LTE-U transmit requests), joint scheduler 310 may implement what is referred to as "persistent scheduling." Persistent scheduling ensures that joint scheduler 310 provides Wi-Fi grants at a "periodic" interval, subject to medium access rules. According to persistent scheduling, LTE-U MAC 306 sends one LTE-U transmit request to Wi-Fi MAC 308 indicating a need to transmit LTE-U frames periodically, e.g., for purposes of synchronization. In this case, the LTE-U transmit request includes information that indicates a required periodicity of LTE-U transmission (e.g., every 50 ms) and a duration for each LTE-U transmission (e.g., 2 ms). The single LTE-U transmit request replaces repeated LTE-U transmit requests. Responsive to the single LTE-U transmit request, joint scheduler 310 schedules periodic LTE-U transmit opportunities that fill the requested need, schedules appropriate periodic quiet messages, and provides corresponding periodic LTE-U grants back to LTE-U MAC 306. In support of persistent scheduling, AP 104 may use a Quiet element (defined in IEEE 802.11n) or a Quiet Channel element (defined in IEEE 802.11ac) to schedule the periodic quiet periods (for an entire channel bandwidth or a secondary channel, e.g., 80 MHz), to ensure regular LTE-U transmit opportunities without any interruption by Wi-Fi clients in the BSS.

At 455, controller 205 causes the LTE-U frame corresponding to the scheduled LTE-U transmit opportunity to be transmitted in accordance with the timing established by LTE-U transmit opportunity and so that the LTE-U frame is aligned with an LTE-U system sub-frame boundary. In the example of FIG. 3, LTE-U MAC 306 transmits the LTE-U frame (indicated at "5" in FIG. 3) based on the LTE-U transmit opportunity conveyed in LTE-U grant 4.

Figure 5:
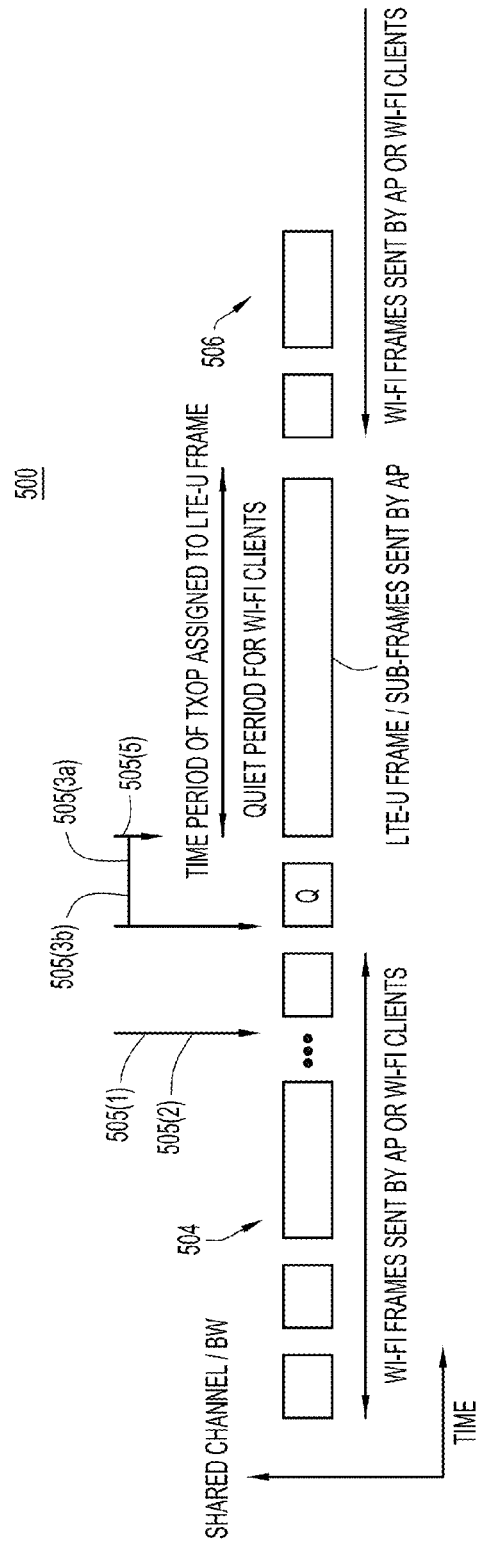
FIG. 5 is a timing diagram that shows an example series of Wi-Fi and LTE-U frames transmitted in a shared channel bandwidth as a result of jointly scheduling transmit opportunities for the frames using the method of FIG. 4, according to an example embodiment.

Reference is now made to FIG. 5. FIG. 5 is a timing diagram 500 that shows an example series of Wi-Fi and LTE-U frames transmitted in a shared channel bandwidth in accordance with joint scheduling of transmit opportunities for the frames. In timing diagram 500, reference numerals "1" (LTE-U transmit request), "2" (add the LTE-U transmit request to the LTE-U queue), "3a" (send Wi-Fi quiet message), "3b" (issue LTE-U grant), and "5" (transmit LTE-U frame) refer to the messages or message exchanges correspondingly indicated in FIG. 3.

Reference is now made to FIG. 5. FIG. 5 is a timing diagram 500 that shows an example series of Wi-Fi and LTE-U frames transmitted in a shared channel bandwidth in accordance with joint scheduling of transmit opportunities for the frames. In timing diagram 500, reference numerals 505(1) (LTE-U transmit request), 505(2) (add the LTE-U transmit request to the LTE-U queue), 505(3a) (send Wi-Fi quiet message), 505(3b) (issue LTE-U grant), and 505(5) (transmit LTE-U frame) correspond respectively to the messages or message exchanges "1," "2," "3a," "3b," and "5" indicated in FIG. 3.

Traversing diagram 500 from left to right, initially, at 504, AP 104 and Wi-Fi clients 108 exchange Wi-Fi frames. At 505(1), LTE-U MAC 306 issues an LTE-U transmit request. At 505(2), Wi-Fi MAC 308 adds the request to LTE-U queue 328. After LTE-U transmission request wins the internal contention in joint scheduler 310, at 505(3a) and 505(3b), joint scheduler 310 sends a quiet message Q to command a Wi-Fi quiet period (for the upcoming LTE-U TXOP) and then issues an LTE-U grant indicating an LTE-U TXOP. At 505(5), LTE-U MAC 306 transmits an LTE-U frame during the LTE-U TXOP/quiet period. After the LTE-U TXOP, which is about the same time that the quiet period has ended, at 506, AP 104 and Wi-Fi clients 108 again exchange Wi-Fi frames.

With reference to FIG. 6, there is shown a flowchart of an example method 600 of jointly scheduling LTE-U and Wi-Fi frames in Wi-Fi primary and secondary channels performed by AP 104, according to an embodiment. Primary and secondary channels are bundled such that AP 104 may transmit on the primary channel only, the primary and secondary channels concurrently, but not on the secondary channel only.

At 605, controller 205 configures AP 104 to transmit Wi-Fi frames in both primary and secondary channels and LTE-U frames only in a limited LTE-U bandwidth of the secondary channel.

At 610, controller 205, schedules first Wi-Fi frames for transmission across both the primary and secondary channels during a Wi-Fi only transmit period.

At 615, controller 205 schedules:
a. second Wi-Fi frames for transmission across the primary and secondary channels, except the limited LTE-U bandwidth, during a shared Wi-Fi/LTE-U transmit period that is occurs after (or in some embodiments, overlapped with) the Wi-Fi only transmit period; and
b. the LTE-U frames for transmission only in the limited LTE-U bandwidth during the shared Wi-Fi/LTE-U transmit period, i.e., concurrent with transmission of the second Wi-Fi frames.

At 620, controller 205 schedules a Wi-Fi quiet message for transmission in the primary channel only and during a time period between the Wi-Fi only and shared Wi-Fi/LTE-U transmit periods, where the Wi-Fi quiet message commands Wi-Fi clients not to transmit in the limited LTE-U bandwidth (which falls in the Wi-Fi secondary channel such as the secondary 80 MHz channel in the case of a 160 MHz BSS or the secondary 40 MHz channel in the case of an 80 MHz BSS) during the upcoming shared Wi-Fi/LTE-U transmit period.

Figure 7:
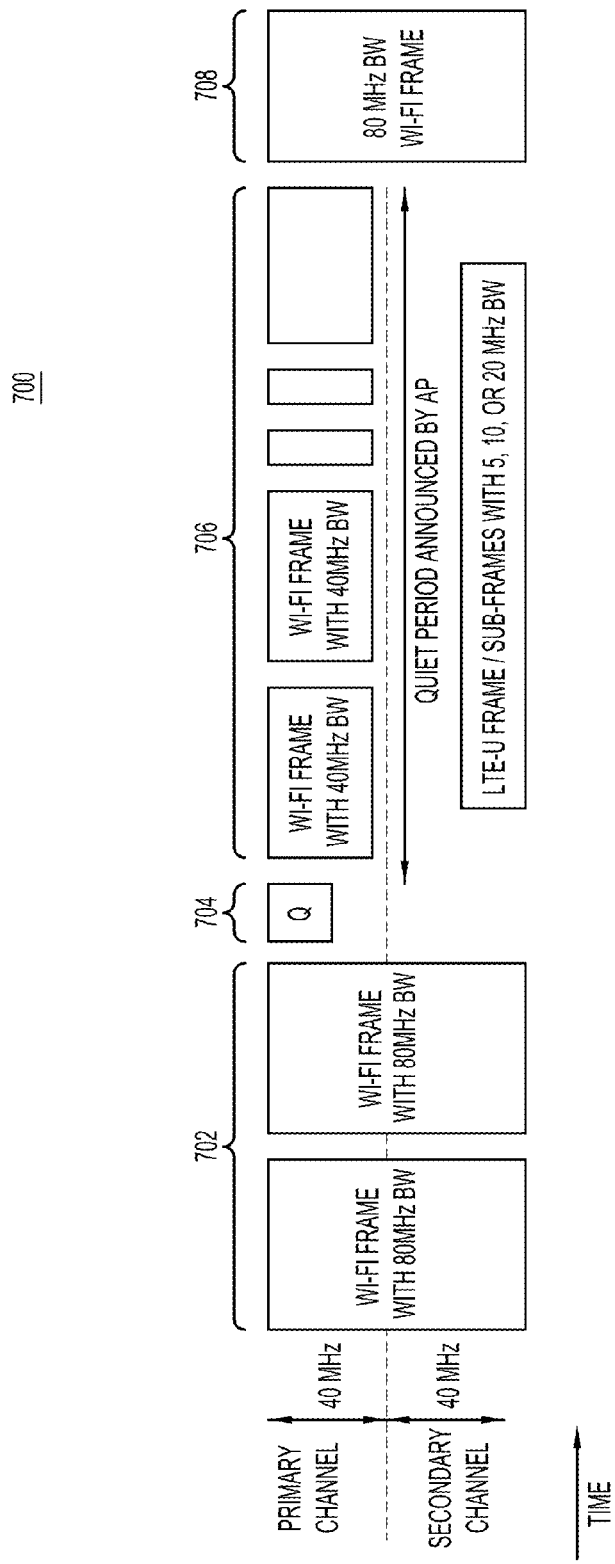
FIG. 7 is a timing diagram that shows an example series of Wi-Fi and LTE-U frames transmitted by the AP in primary channel and secondary channels as a result of jointly scheduling transmit opportunities for the frames using the method of FIG. 6, according to an example embodiment.

FIG. 7 is a timing diagram 700 that shows an example series of Wi-Fi and LTE-U frames transmitted by AP 104 in a primary channel and a secondary channel, resulting from joint scheduling of the frames according to method 600. In the example of FIG. 7, the primary and secondary channels are contiguous 40 MHz bandwidths, yielding a combined contiguous bandwidth of 80 MHz. AP 104 allocates only a portion of the secondary channel to LTE-U frames, such as 5, 10, or 20 MHz in the secondary channel.

During a Wi-Fi only transmit period 702, AP 104 transmits only Wi-Fi frames across both of the primary and secondary channels. At 704, between the Wi-Fi only transmit period 702 and an upcoming shared Wi-Fi/LTE-U transmit period 706, AP 104 transmits a quiet message Q only in the primary channel (or a portion thereof) to announce a quiet period corresponding to the upcoming shared Wi-Fi/LTE-U transmit period. The quite message commands Wi-Fi clients not to transmit on the secondary channel during the quiet period (or at least not to transmit in that portion of the secondary channel allocated to the LTE-U frames). During shared Wi-Fi/LTE-U transmit period 706, AP 104 concurrently transmits Wi-Fi frames on the primary channel and LTE-U frames in the portion of the secondary channel allocated to the LTE-U frames. Subsequently, during a Wi-Fi only transmit period 708, AP 104 again transmits only Wi-Fi frames across the primary and secondary channels.

Another example of a primary/secondary channel configuration includes: Wi-Fi with 160 MHz bandwidth (BW) (i.e., 80 MHz primary channel BW and 80 MHz secondary channel BW), and LTE-U with 5/10/20 MHz BW on the secondary 80 MHz channel. In that example, the 40 MHz BWs depicted in FIG. 7 would be 80 MHz BWs.

Still another example of a primary/secondary channel configuration includes: Wi-Fi with 40 MHz BW (i.e., 20 MHz primary channel BW and 20 MHz secondary channel BW), and LTE-U with 5/10/20 MHz BW on the secondary 20 MHz channel. In that example, the 80 MHz BWs depicted in FIG. 7 would be 40 MHz BWs.

As mentioned above in connection with joint scheduling operations 435-445, Enhanced Distributed Channel Access (EDCA) techniques may be used to determine an order in which Wi-Fi and LTE-U frames are scheduled for transmission. In an embodiment of EDCA, random variables are determined for and assigned to corresponding ones of the Wi-Fi and LTE-U frames in contention for transmission, as pending in Wi-Fi and LTE-U AC queues 320-328 (see FIG. 3). Each random variable represents a statistical (transmission) priority of the queue for which the random variable was determined relative to the other queues. The queued frame (i.e., the AC queue) to which a minimum random variable among the random variables is assigned wins the contention and is transmitted before the frames from the other queues. After that frame is transmitted, the frame associated with the next minimum random variable is transmitted, and so on across the queues.

The random variable for each AC (i.e., for each AC queue and frame queued therein) is determined based on a corresponding distinct set of AC parameters for that AC. Example sets of AC parameters for VO, VI, BK, and BE Wi-Fi ACs and the LTE-U AC are listed by column in Table 1 below. Each set of AC parameters may include CWmin, CWmax, Arbitration Inter-Frame Space (AIFS), and Max TXOP. The AC parameters may also be referred to as QoS or EDCA parameters/variables.

TABLE 1

|  | VO | VI | BK | BE | LTE-U |
|---|---|---|---|---|---|
| CWmin | 3 | 7 | 15 | 15 | 15 |
| CWmax | 7 | 15 | 1023 | 1023 | 1023 |
| AIFS | 2 | 2 | 3 | 7 | 7 |
| Max TXOP | 1.504 ms | 3.008 ms | — | — | Defined by Joint Scheduler 310 |

According to one embodiment of EDCA, the random variable assigned to each frame for (i.e., to each AC queue) is determined based on the corresponding AIFS parameter plus a random variable (randomly) selected from a range of values equal to 0, 1, 2, . . . , CW−1, where CW is initially set equal to CWmin for the corresponding AC. In the event of a collision (i.e., the same random variable is selected for each of two frames corresponding to two ACs) or if an acknowledgement is not received for a transmitted frame for a given AC, the value of CW for that AC is doubled for a next selection made to avoid the initial collision, but the maximum value for CW is CWmax.

In the example of Table 1 above, some of the sets of AC parameters are different so as to establish different AC selection priorities. The AC parameters for Wi-Fi voice (VO) are chosen to give voice a higher priority. As a result, a Wi-Fi voice frame has a statistically higher chance of winning contention over other types of frames (ACs). Also, the AC parameters used to establish priority for the LTE-U AC is the same as those for the Wi-Fi BE AC; however, this is not necessarily the case. Different LTE-U AC parameters may be chosen to establish different relative AC priorities, as needed. Note that joint scheduler 310 may specify a maximum duration for the LTE-U frame.

In an embodiment, dynamic LTE-U AC parameter values may be used for the LTE-U AC because an LTE-U frame may contain several data units destined for several different LTE-U clients 106; the data units may include sets of voice, video, best effort or background traffic. In the dynamic LTE-U AC embodiment, LTE-U MAC 306 expands the LTE-U transmit request for a given LTE-U frame to specify a percentage of voice, video, background, and best effort units within the given LTE-U frame. When joint scheduler 310 receives the expanded LTE-U transmit request, the joint scheduler determines which CW variables to select for the corresponding frame. For example, if the majority of the frame data units are voice and video, joint scheduler 310 may select LTE-U AC parameters equal to those of the Wi-Fi VO AC. Alternatively, joint scheduler 310 may calculate an integer weighted average of the LTE-U AC CWmin/CWmax/AIFS parameters based on the percentage received in the expanded LTE-U transmit request. Table 2 represents an example of AC parameters used in the dynamic LTE-U AC embodiment.

TABLE 2

|  | VO | VI | BK | BE | LTE-U |
|---|---|---|---|---|---|
| CWmin | 3 | 7 | 15 | 15 | Variable. Any, or average, |
| CWmax | 7 | 15 | 1023 | 1023 | of the associated values of |
| AIFS | 2 | 2 | 3 | 7 | VO/VI/BK/BE |
| Max TXOP | 1.504 ms | 3.008 ms | — | — | NA |

Joint scheduling techniques and a joint scheduler for Wi-Fi and LTE-U downlink traffic has been described. The joint scheduler achieves "fair" transmit sharing between Wi-Fi and LTE-U frames. The joint scheduler treats LTE-U traffic as a new AC in addition to existing Wi-Fi ACs. The medium access for Wi-Fi and LTE-U is managed by a single joint scheduler when the Wi-Fi and LTE-U use same or overlapping channels. For the Wi-Fi ACs, on gaining access, a Wi-Fi AP subsystem transmits the corresponding AC frames or PDUs. For LTE-U, the joint scheduler is responsible primarily for granting medium access. The actual transmission of LTE-U frames may be performed by a LTE-U subsystem. In the LTE-U subsystem, an LTE-U MAC requests access time from the joint scheduler via an LTE-U request. The LTE-U MAC may not send LTE-U frames to the joint scheduler. Thus, the joint scheduler may create a virtual/dummy LTE-U queue that holds the attributes of the LTE-U transmit request, e.g., a requested transmit duration (typically measured in LTE-U sub-frames of 1 ms). The joint scheduler schedules LTE-U TXOPs based on EDCA mechanisms. The joint scheduler: 1) provides an LTE-U grant signal to allow the LTE-U MAC to transmit; and 2) sends appropriate frames (such as Quiet frame or CTS-to-self) to prevent other Wi-Fi transmission during that interval.

In summary, in one form, a method is provided comprising: in an access point configured to transmit first protocol transmit frames according to a first wireless protocol and second protocol transmit frames according to a second wireless protocol in a shared channel bandwidth that encompasses unlicensed channel bandwidth associated with the second wireless protocol: assigning one of multiple, prioritized, first protocol access categories to each first protocol transmit frame based on a type of data in the transmit frame; assigning to each second protocol transmit frame a second protocol access category prioritized relative to the first protocol access categories; and scheduling first and second transmit opportunities for the first protocol transmit frames and the second protocol transmit frames, respectively, in the shared channel bandwidth based on the prioritized first and second protocol access categories.

In another form, a method is provided comprising: in an access point configured to transmit Wi-Fi transmit frames and Long-Term Evolution-Unlicensed (LTE-U) transmit frames in a shared channel bandwidth in accordance with Wi-Fi and LTE-U protocols, respectively: assigning one of multiple, prioritized, Wi-Fi access categories to each Wi-Fi transmit frame based on a type of data in the transmit frame; assigning to each LTE-U transmit frame a LTE-U access category prioritized relative to the Wi-Fi access categories; and scheduling Wi-Fi and LTE-U transmit opportunities for the Wi-Fi transmit frames and the LTE-U transmit frames, respectively, in the shared channel bandwidth based on the prioritized Wi-Fi and LTE-U access categories.

In yet another form, an apparatus is provided comprising: radios to transmit Wi-Fi and Long-Term Evolution-Unlicensed (LTE-U) transmit frames in accordance with Wi-Fi and LTE-U protocols; and a processor coupled to the network interface unit and the radios, to: assign one of multiple, prioritized, Wi-Fi access categories to each Wi-Fi transmit frame based on a type of data in the transmit frame; assign to each LTE-U transmit frame a LTE-U access category prioritized relative to the Wi-Fi access categories; and schedule Wi-Fi and LTE-U transmit opportunities for the Wi-Fi transmit frames and the LTE-U transmit frames, respectively, in the shared channel bandwidth based on the prioritized Wi-Fi and LTE-U access categories.

In yet another form, a tangible/non-transitory computer readable storage media is provided. The media is encoded with instructions that, when executed by a processor of an access point configured to transmit Wi-Fi and Long-Term Evolution-Unlicensed (LTE-U) transmit frames in accordance with Wi-Fi and LTE-U protocols, cause the processor to: assign one of multiple, prioritized, Wi-Fi access categories to each Wi-Fi transmit frame based on a type of data in the transmit frame; assign to each LTE-U transmit frame a LTE-U access category prioritized relative to the Wi-Fi access categories; and schedule Wi-Fi and LTE-U transmit opportunities for the Wi-Fi transmit frames and the LTE-U transmit frames, respectively, in the shared channel bandwidth based on the prioritized Wi-Fi and LTE-U access categories.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   in an access point configured to transmit Wi-Fi transmit frames according to a Wi-Fi protocol and Long-Term Evolution-Unlicensed (LTE-U) transmit frames according to a LTE-U protocol in a shared channel bandwidth that encompasses unlicensed channel bandwidth associated with the LTE-U protocol:
   assigning one of multiple, prioritized, Wi-Fi access categories to each Wi-Fi transmit frame based on a type of data in the transmit frame;
   assigning to each LTE-U transmit frame a LTE -U access category prioritized relative to the Wi-Fi access categories;
   establishing prioritized Wi-Fi transmit queues each corresponding to a respective one of the multiple Wi-Fi access categories and an LTE-U transmit queue corresponding to the LTE-U access category;
   receiving LTE-U transmit requests to transmit corresponding ones of the LTE-U transmit frames;
   placing a transmit frame indicator representative of each Wi-Fi transmit frame and each LTE-U transmit frame into the transmit queue corresponding to the access category assigned to that transmit frame, wherein the placing includes placing the LTE-U transmit requests in lieu of the corresponding LTE-U transmit frames into the LTE-U transmit queue, and placing the Wi-Fi transmit frames into the Wi-Fi transmit queues corresponding to the Wi-Fi access categories assigned to the Wi-Fi transmit frames; and
   scheduling Wi-Fi and LTE-U transmit opportunities for the Wi-Fi transmit frames and the LTE-U transmit frames, respectively, in the shared channel bandwidth based on the prioritized Wi-Fi and LTE-U access categories, the scheduling including determining a transmission order of the queued Wi-Fi and LTE-U transmit frame indicators based on the Wi-Fi and LTE-U access categories corresponding to the transmit queues.

2. The method of claim 1, further comprising issuing an LTE-U grant message indicating each scheduled LTE-U transmit opportunity prior to that scheduled LTE-U opportunity.

3. The method of claim 1, further comprising assigning a distinct set of Wi-Fi access category parameters to each of the Wi-Fi access categories, and a set of LTE-U access category parameters to the LTE-U access category, wherein the determining a transmission order comprises determining the transmission order in accordance with Enhanced Distributed Channel Access (EDCA) rules, the EDCA rules including:
   determining a relative transmission statistical priority for each of the transmit queues based on the set of access category parameters corresponding to that transmit queue; and
   determining the transmission order of the Wi-Fi and LTE-U transmit frames based on the determined relative transmission statistical priorities.

4. The method of claim 1, wherein:
   the assigning Wi-Fi access categories includes assigning one of voice (VO), video (VI), background (BK), and best effort (BE) access categories to each of the Wi-Fi transmit frames; and
   the assigning to each LTE-U transmit frame includes assigning the LTE-U access categories prioritized relative to the Wi-Fi VO, VI, BK, and BE access categories; and
   the scheduling includes applying Enhanced Distributed Channel Access (EDCA) rules across the prioritized Wi-Fi and LTE-U access categories to resolve schedule contention between the Wi-Fi and LTE-U transmit frames.

5. The method of claim 1, wherein the scheduling includes, for each scheduled LTE-U transmit opportunity:
   constructing a Wi-Fi quiet message commanding Wi-Fi clients of the AP not to transmit in the shared channel bandwidth during the LTE-U transmit opportunity; and
   scheduling the Wi-Fi quiet message for transmission to the Wi-Fi clients prior to the scheduled LTE-U transmit opportunity.

6. The method of claim 5, wherein the scheduling includes setting a duration of each scheduled LTE-U transmit opportunity to be greater than a duration of the LTE-U transmit frame that is to be transmitted in the LTE-U transmit opportunity to enable flexible transmission alignment of the LTE-U transmit frame with a periodic LTE-U system transmit frame boundary.

7. The method of claim 5, further comprising:
   sending an LTE-U grant message corresponding to each LTE-U scheduled transmit opportunity indicating the LTE-U transmit opportunity.

8. The method of claim 1, further comprising dynamically adjusting a priority of the access category assigned to the LTE-U for each LTE-U transmit frame based on a type of data in the LTE-U transmit frame.

9. The method of claim 1, further comprising:
configuring the AP to transmit the Wi-Fi transmit frames in both primary and secondary channels and the LTE-U transmit frames only in an LTE-U bandwidth portion of the secondary channel;
in a first time period, scheduling the Wi-Fi transmit frames for transmission across both the primary and secondary channels; and
in a second time period subsequent to or overlapped with the first period, scheduling for transmission:
additional Wi-Fi transmit frames across both the primary and secondary channels except for in the LTE-U bandwidth portion; and
the LTE-U transmit frames only in the LTE-U bandwidth portion of the second channel concurrent with the transmission of the additional Wi-Fi transmit frames.

10. The method of claim 9, further comprising:
constructing a Wi-Fi quiet message commanding Wi-Fi clients not to transmit in the LTE-U bandwidth portion of the secondary channel during the second time period; and
during a third time period between the first and second time periods, scheduling the quiet message for transmission in the primary channel.

11. The method of claim 1, wherein the scheduling includes applying Enhanced Distributed Channel Access (EDCA) rules across the prioritized Wi-Fi and LTE-U access categories to resolve schedule contention between the Wi-Fi and LTE-U transmit frames.

12. An apparatus comprising:
radios to transmit Wi-Fi and Long-Term Evolution-Unlicensed (LTE-U) transmit frames in accordance with Wi-Fi and LTE-U protocols; and
a processor coupled to the network interface unit and the radios, to:
assign one of multiple, prioritized, Wi-Fi access categories to each Wi-Fi transmit frame based on a type of data in the transmit frame;
assign to each LTE-U transmit frame a LTE-U access category prioritized relative to the Wi-Fi access categories;
establish prioritized Wi-Fi transmit queues each corresponding to a respective one of the multiple Wi-Fi access categories and an LTE-U transmit queue corresponding to the LTE-U access category;
receive LTE-U transmit requests to transmit corresponding ones of the LTE-U transmit frames;
place a transmit frame indicator representative of each Wi-Fi transmit frame and each LTE-U transmit frame into the transmit queue corresponding to the access category assigned to that transmit frame by placing the LTE-U transmit requests in lieu of the corresponding LTE-U transmit frames into the LTE-U transmit queue, and placing the Wi-Fi transmit frames into the Wi-Fi transmit queues corresponding to the Wi-Fi access categories assigned to the Wi-Fi transmit frames; and
schedule Wi-Fi and LTE-U transmit opportunities for the Wi-Fi transmit frames and the LTE-U transmit frames, respectively, in the shared channel bandwidth based on the prioritized Wi-Fi and LTE-U access categories, wherein, to schedule the Wi-Fi and LTE-U transmit opportunities, the processor is configured to determine a transmission order of the queued Wi-Fi and LTE-U transmit frame indicators based on the Wi-Fi and LTE-U access categories corresponding to the transmit queues.

13. The apparatus of claim 12, wherein the processor is further configured to assign a distinct set of Wi-Fi access category parameters to each of the Wi-Fi access categories, and a set of LTE-U access category parameters to the LTE-U access category, and wherein the processor is configured to determine the transmission order in accordance with Enhanced Distributed Channel Access (EDCA) rules by:
determining a relative transmission statistical priority for each of the transmit queues based on the set of access category parameters corresponding to that transmit queue; and
determining the transmission order of the Wi-Fi and LTE-U transmit frames based on the determined relative transmission statistical priorities.

14. The apparatus of claim 12, wherein:
the processor is configured to assign the Wi-Fi access categories by assigning one of voice (VO), video (VI), background (BK), and best effort (BE) access categories to each of the Wi-Fi transmit frames; and
the processor is configure to assign to each LTE-U transmit frame by assigning the LTE-U access categories prioritized relative to the Wi-Fi VO, VI, BK, and BE access categories; and
the processor is configured to schedule by applying Enhanced Distributed Channel Access (EDCA) rules across the prioritized Wi-Fi and LTE-U access categories to resolve schedule contention between the Wi-Fi and LTE-U transmit frames.

15. The apparatus of claim 12, wherein the processor is configured to schedule by, for each scheduled LTE-U transmit opportunity:
constructing a Wi-Fi quiet message commanding Wi-Fi clients of the AP not to transmit in the shared channel bandwidth during the LTE-U transmit opportunity; and
scheduling the Wi-Fi quiet message for transmission to the Wi-Fi clients prior to the scheduled LTE-U transmit opportunity.

16. The apparatus of claim 12, wherein the processor is configured to schedule by applying Enhanced Distributed Channel Access (EDCA) rules across the prioritized Wi-Fi and LTE-U access categories to resolve schedule contention between the Wi-Fi and LTE-U transmit frames.

17. The apparatus of claim 12, wherein the processor is further configured to schedule by setting a duration of each scheduled LTE-U transmit opportunity to be greater than a duration of the LTE-U transmit frame that is to be transmitted in the LTE-U transmit opportunity to enable flexible transmission alignment of the LTE-U transmit frame with a periodic LTE-U system transmit frame boundary.

18. The apparatus of claim 12, wherein the processor is further configured to:
send an LTE-U grant message corresponding to each LTE-U scheduled transmit opportunity indicating the LTE-U transmit opportunity.

19. The apparatus of claim 12, wherein the processor is further configured to dynamically adjust a priority of the access category assigned to the LTE-U for each LTE-U transmit frame based on a type of data in the LTE-U transmit frame.

20. A tangible computer readable storage media encoded with instructions that, when executed by a processor of an access point configured to transmit Wi-Fi and Long-Term Evolution-Unlicensed (LTE-U) transmit frames in accordance with Wi-Fi and LTE-U protocols, cause the processor to:

assign one of multiple, prioritized, Wi-Fi access categories to each Wi-Fi transmit frame based on a type of data in the transmit frame;

assign to each LTE-U transmit frame a LTE-U access category prioritized relative to the Wi-Fi access categories;

establish prioritized Wi-Fi transmit queues each corresponding to a respective one of the multiple Wi-Fi access categories and an LTE-U transmit queue corresponding to the LTE-U access category;

receive LTE-U transmit requests to transmit corresponding ones of the LTE-U transmit frames:

place a transmit frame indicator representative of each Wi-Fi transmit frame and each LTE-U transmit frame into the transmit queue corresponding to the access category assigned to that transmit frame by placing the LTE-U transmit requests in lieu of the corresponding LTE-U transmit frames into the LTE-U transmit queue, and by placing the Wi-Fi transmit frames into the Wi-Fi transmit queues corresponding to the Wi-Fi access categories assigned to the Wi-Fi transmit frames, and schedule Wi-Fi and LTE-U transmit opportunities for the Wi-Fi transmit frames and the LTE-U transmit frames, respectively, in the shared channel bandwidth based on the prioritized Wi-Fi and LTE-U access categories, wherein the instructions to cause the processor to schedule include instructions to cause the processor to determine a transmission order of the queued Wi-Fi and LTE-U transmit frame indicators based on the Wi-Fi and LTE-U access categories corresponding to the transmit queues.

21. The computer readable storage media of claim 20, wherein the instructions include instructions to cause the processor to:

assign one of voice (VO), video (VI), background (BK), and best effort (BE) access categories to each of the Wi-Fi transmit frames;

assign the LTE-U access categories prioritized relative to the Wi-Fi VO, VI, BK, and BE access categories; and schedule by applying Enhanced Distributed Channel Access (EDCA) rules across the prioritized Wi-Fi and LTE-U access categories to resolve schedule contention between the Wi-Fi and LTE-U transmit frames.

22. The computer readable storage media of claim 20, wherein the instructions include instructions to cause the processor to schedule by applying Enhanced Distributed Channel Access (EDCA) rules across the prioritized Wi-Fi and LTE-U access categories to resolve schedule contention between the Wi-Fi and LTE-U transmit frames.

23. The computer readable storage media of claim 20, wherein the instructions to cause the processor to schedule include instructions to cause the processor to set a duration of each scheduled LTE-U transmit opportunity to be greater than a duration of the LTE-U transmit frame that is to be transmitted in the LTE-U transmit opportunity to enable flexible transmission alignment of the LTE-U transmit frame with a periodic LTE-U system transmit frame boundary.

24. The computer readable storage media of claim 20, further comprising instructions to cause the processor to:

send an LTE-U grant message corresponding to each LTE-U scheduled transmit opportunity indicating the LTE-U transmit opportunity.

25. The computer readable storage media of claim 20, further comprising instructions to cause the processor to dynamically adjust a priority of the access category assigned to the LTE-U for each LTE-U transmit frame based on a type of data in the LTE-U transmit frame.

\* \* \* \* \*